(12) United States Patent
Wendt

(10) Patent No.: US 12,006,978 B2
(45) Date of Patent: Jun. 11, 2024

(54) WHEEL BEARING UNIT AND METHOD FOR MANUFACTURING A SEAL UNIT OF A WHEEL BEARING UNIT

(71) Applicant: AKTIEBOLAGET SKF, Gothenburg (SE)

(72) Inventor: Volker Wendt, Üchtelhausen/Zell (DE)

(73) Assignee: AKTIEBOLAGET SKF, Gothenburg (SE)

( * ) Notice: Subject to any disclaimer, the term of this patent is extended or adjusted under 35 U.S.C. 154(b) by 181 days.

(21) Appl. No.: 17/525,260

(22) Filed: Nov. 12, 2021

(65) Prior Publication Data

US 2022/0170506 A1 Jun. 2, 2022

(30) Foreign Application Priority Data

Nov. 27, 2020 (DE) .......................... 102020131561.9

(51) Int. Cl.
| | |
|---|---|
| *F16C 33/76* | (2006.01) |
| *B60B 27/00* | (2006.01) |
| *F16C 33/60* | (2006.01) |
| *F16C 33/78* | (2006.01) |

(52) U.S. Cl.
CPC ........ *F16C 33/768* (2013.01); *B60B 27/0073* (2013.01); *F16C 33/60* (2013.01); *F16C 33/7813* (2013.01); *F16C 2326/02* (2013.01)

(58) Field of Classification Search
CPC .... F16C 33/60; F16C 33/768; F16C 33/7813; F16C 2326/02; F16C 2226/70–78; B60B 27/0073; F16J 15/12–128
See application file for complete search history.

(56) References Cited

U.S. PATENT DOCUMENTS

| 2,762,117 | A | * | 9/1956 | Houck | ..................... F16C 33/14 |
| | | | | | 384/301 |
| 4,383,354 | A | * | 5/1983 | Saurenman | ............. B23P 11/02 |
| | | | | | 29/524 |
| 5,242,229 | A | * | 9/1993 | McLarty | ............. F16C 33/7879 |
| | | | | | 384/477 |

FOREIGN PATENT DOCUMENTS

| CN | 111692214 A | * | 9/2020 | |
| DE | 102014200709 A1 | * | 7/2015 | ............ F16C 33/605 |
| DE | 102015218996 A1 | * | 4/2017 | ............ F16C 19/543 |
| JP | 4690170 B2 | * | 6/2011 | |
| WO | WO-2015092099 A1 | * | 6/2015 | ......... B60B 27/0073 |

OTHER PUBLICATIONS

"Everything You Need to Know About O-Rings and Seals" website. https://uk.rs-online.com/web/content/discovery/ideas-and-advice/seals-o-rings-guide (Year: 2018).*
Machine Translation of JP-4690170-B2 (Year: 2011).*

(Continued)

*Primary Examiner* — Alan B Waits
(74) *Attorney, Agent, or Firm* — J-TEK LAW PLLC; Scott T. Wakeman; Mark A. Ussai

(57) ABSTRACT

A wheel bearing unit includes a first inner ring having an axial end side, a second inner ring having an axial end side contacting the axial end side of the first inner ring at a joint, and a seal unit that seals the joint between the first inner ring and the second inner ring. The seal unit includes at least one seal element and at least one further component that exerts pressure on the at least one seal element, and the at least one further component is at least partially comprised of sheet metal.

10 Claims, 3 Drawing Sheets

(56) References Cited

OTHER PUBLICATIONS

Machine Translation of WO-2015092099-A1 (Year: 2015).*
Machine Translation of DE-102014200709-A1 (Year: 2015).*
Machine Translation of DE-102015218996-A1 (Year: 2017).*
Machine Translation of CN-111692214-A (Year: 2020).*

* cited by examiner

WHEEL BEARING UNIT AND METHOD FOR MANUFACTURING A SEAL UNIT OF A WHEEL BEARING UNIT

CROSS-REFERENCE

This application claims priority to German patent application no. 10 2020 131 561.9 filed on Nov. 27, 2020, the contents of which are fully incorporated herein by reference.

TECHNOLOGICAL FIELD

The disclosure is directed to a wheel bearing unit that includes a seal unit between two rings of the bearing.

BACKGROUND

A driven wheel head of a truck may come into contact with oil from an axle drive if oil sprays through a hollow drive shaft when the truck corners. The wheel bearing must be sealed to prevent this oil from penetrating into the wheel bearing. One path into the bearing is through or past the outboard seal. A further path into the bearing runs via the closure nut and the keyway of the washer behind the closure nut along the inner rings to the fitting surfaces 10, 12 of the inner rings (FIG. 1). These fitting surfaces are usually pressed tightly against each other by the closure-nut force of approximately 8 to 10 tons. However, under extreme conditions during cornering, it is possible that these inner-ring surfaces, which should in principle abut against each other, partially separate due to the severe distortions in the wheel head. In these situations a central seal 18 prevents the oil from penetrating into the wheel bearing. This seal is usually located in the wheel bearing between the bearing raceways 20, 22, directly over the mutually abutting side surfaces of the inner rings. The seal (FIGS. 1 and 3) normally includes a rubber or a rubber-type seal ring 24 that presses against the mutually abutting inner rings and a rigid securing ring 26 (FIG. 2) that applies a certain radial force onto the radial outer circumference of the seal ring. This stiffer securing ring is required because the rubber or the rubber-type seal ring does not generate sufficient radial forces against the two inner rings because the circumferential stresses in this ring are too low.

This securing ring is currently comprised of a plastic ring having an inner diameter onto which the seal ring 24 is pressed. Lateral separators or teeth 28 adjacent to the seal ring 24 retain it in the center of the securing ring.

SUMMARY

An aspect of the present disclosure comprises providing a wheel bearing of the above-mentioned type with an efficient design.

A wheel bearing unit according to the disclosure includes a first inner ring, which is part of a first rolling-element bearing of the wheel bearing unit, and at least one second inner ring, which is part of a second rolling-element bearing of the wheel bearing unit and that includes an end side that abuts against an end side of the first inner ring. The wheel bearing unit also includes a seal unit that seals between the inner rings which seal unit includes at least one seal element and at least one further component that exerts pressure on the seal element.

The component is preferably at least partially comprised of sheet metal. An efficient construction can thereby be achieved. In particular, tool costs can be saved because sheet metal can be processed by cost-effective tools, and furthermore by using these tools such components, which have different inner diameters and are therefore suitable for different wheel bearing units, can be particularly cost-effectively manufactured. Furthermore, it can be achieved in particular that the component exerts the correct pressure on the seal element in a particularly reliable manner, and specifically because the sheet metal has an approximately identical thermal extension coefficient to that of the inner ring, and thus the pressure that the component exerts on the seal element remains approximately constant, even in the event of a heating of the wheel bearing unit. The latter is in particular an advantage compared to a complete construction made of plastic, as it exists, for example, with the securing ring of FIGS. 1-3, since plastic expands more strongly during a heating than the steel of the inner ring. Such a heating occurs in particular when a vehicle in which the wheel bearing unit is installed, and which vehicle can be, for example, a truck, brakes downhill many times during a long journey.

The component is preferably comprised at least in large part, and particularly preferably completely, of sheet metal. "In large part" should be understood to mean in particular at least 50 percent by mass. A particularly cost-effective construction together with a very reliable application of a radial force onto the seal element can thereby be achieved.

The component is advantageously configured one-piece. "One-piece" should be understood in particular to mean made of a casting and/or only separable by destruction. In this way a constructively simple design can be achieved.

Furthermore, the component may include a sheet metal ring or may be a sheet metal ring. In this way a deformation, similar to that of the inner rings of the wheel bearing unit, can be achieved in the event of temperature changes.

The sheet metal ring is preferably manufactured from a sheet metal strip whose ends are attached to each other in an interference-fit and/or material-bonded manner. The sheet metal ring is thereby manufacturable using cost-effective tools.

For interference-fit attaching of the ends to each other, one of the ends advantageously has a shape of a dovetail. A reliable and constructively simple attachment can thereby be achieved.

In addition, the seal unit may be disposed on the radial outer sides of the inner rings, so that installation space is saved on a radial inner side of the inner rings, or these are more cost-effectively manufacturable.

Furthermore, a component, in particular for a wheel bearing unit, includes a receiving region that is configured to at least partially receive a seal ring and which is at least in large part comprised of a deformed sheet metal strip whose ends are attached to each other. An efficient construction can thereby be achieved. In particular, a cost-effective construction and simultaneously an ensuring of the function of the component can be achieved.

Furthermore, a method is provided for manufacturing a seal unit of a wheel bearing unit, in which a component of the seal unit is at least partially formed by a sheet metal strip whose ends are attached to each other. An efficient construction can thereby be achieved. In particular, a cost-effective construction and simultaneously an ensuring of the function of the component can be achieved.

The ends of the strip are preferably attached to each other in an interference-fit and/or material-bonded manner, whereby the component is manufacturable using cost-effective tools.

One of the ends is particularly preferably formed in a shape of a dovetail. A reliable and constructively simple attachability can thereby be achieved.

In addition, a method for manufacturing a wheel bearing unit is disclosed, wherein a seal unit of the wheel bearing unit is manufactured according to a method described above. An efficient construction can thereby be achieved.

Further advantages arise from the following description of the drawings. The drawings, the description, and the claims contain numerous features in combination. The person skilled in the art will also advantageously consider the features individually and combine them into further meaningful combinations.

DETAILED DESCRIPTION

Figure 1:
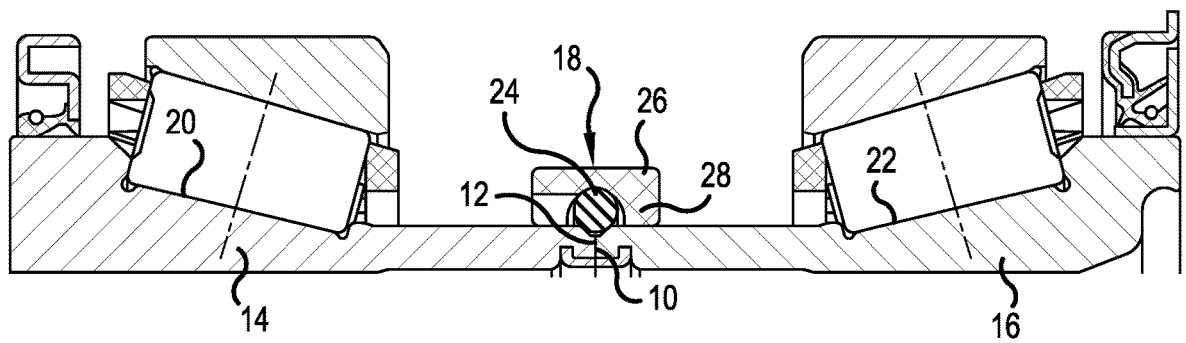
FIG. 1 is a partial axial section through a portion of a conventional wheel bearing unit.
Figure 2:
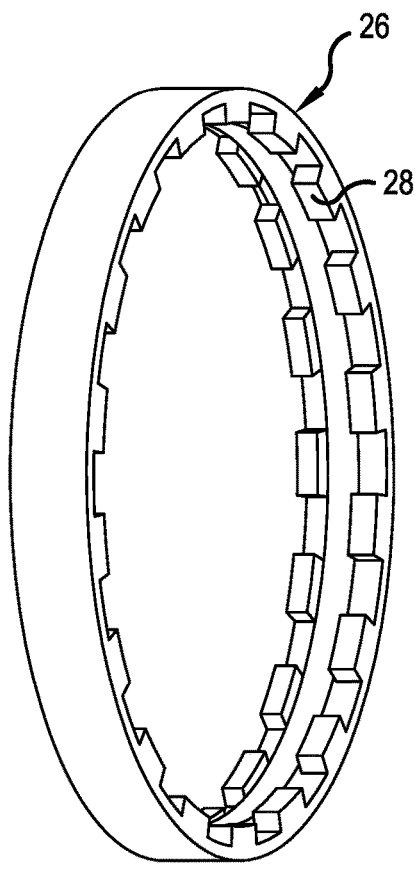
FIG. 2 is a securing ring of a seal of the wheel bearing unit of FIG. 1.
Figure 3:
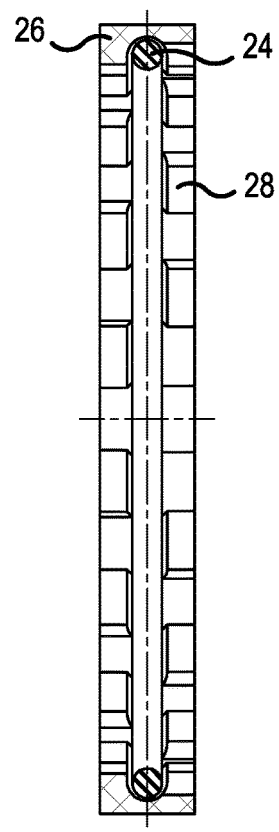
FIG. 3 is an axial section through the seal of FIG. 2.
Figure 4:
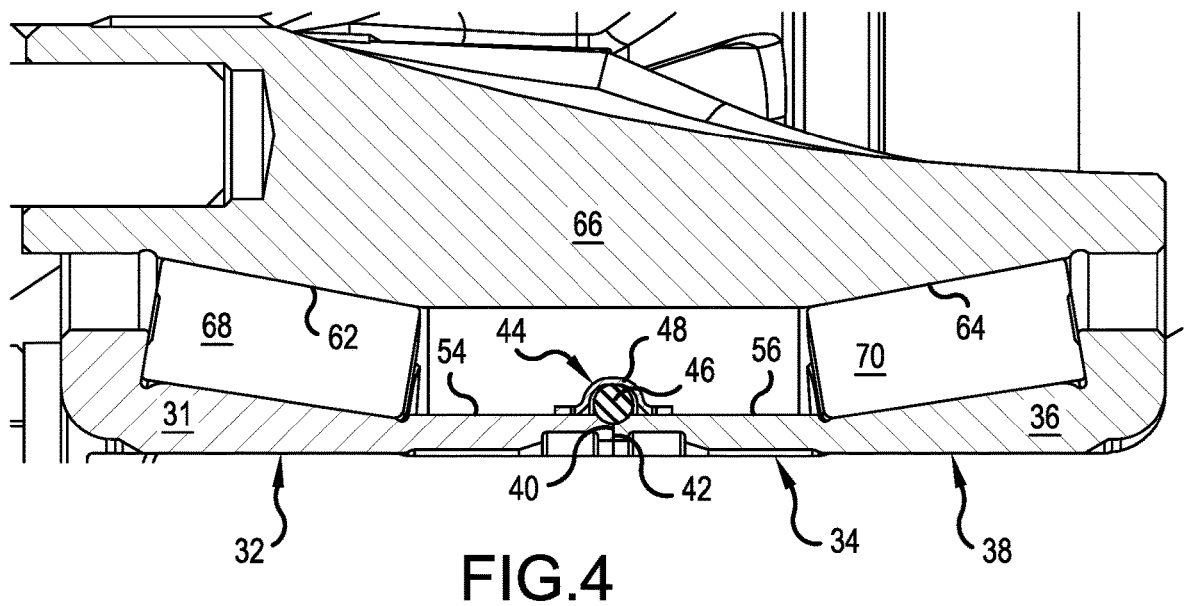
FIG. 4 is an axial section through a wheel bearing unit according to an embodiment of the present disclosure.

FIG. 4 shows a section through a wheel bearing unit 34 along an axial direction of the wheel bearing unit 34. The wheel bearing unit 34 includes a first rolling-element bearing 32 including a first inner ring 31, and a second rolling-element bearing 38 including a second inner ring 36. An end side 40 of the second inner ring 36 abuts against an end side 42 of the first inner ring 31. An outer ring 66 of the wheel bearing unit forms an outer raceway 62 of the rolling-element bearing 32 and an outer raceway 64 of the rolling-element bearing 38. Rolling elements 68 are disposed between the raceway 62 and the inner ring 31. Furthermore, rolling elements 70 are disposed between the inner ring 36 and the raceway 64. In the present case all rolling elements 68, 70 are configured as tapered rollers. The inner rings 31, 36 are pressed against each other in the axial direction by a nut (not depicted).

In a spatial region that is axially between the rolling elements 68 and the rolling elements 70, the wheel bearing unit includes a seal unit 44 that seals between the inner rings 31, 36. The seal unit 44 comprises a seal element 46 that abuts against both inner rings 31, 36. The seal element 46 is configured as an O-ring and abuts against both inner rings continuously along its entire circumference and specifically against radial outer sides 54, 56 of the inner ring 31, 36. In addition, the seal unit 44 comprises a component 48 that exerts a radially inward pressure on the seal element 46, which is continuously present along an entire radially outer circumference of the seal element 46. The component 48 is a sheet metal ring configured one-piece, and is formed entirely of sheet metal.

Figure 6:
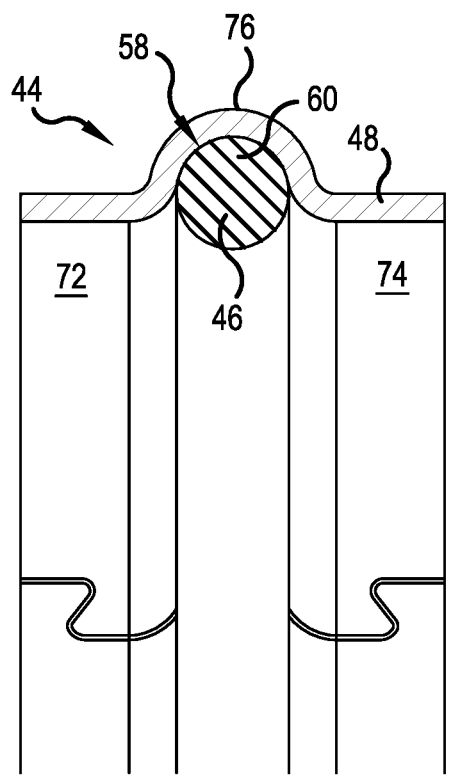
FIG. 6 is part of an axial section through the seal unit of FIG. 5.

The component includes a first region 72 and a second region 74, which each have a shape of a hollow cylinder in an axial section (FIG. 6). In the axial direction between the regions 72, 74, the component 48 has a bulge 76 that extends radially outwardly and thus forms a receiving region 58 on its radially inner side. Both the bulge 76 and the receiving region 58 have annular shape and enclose the inner rings 31, 36. As already mentioned, the seal element 46 is a seal ring 60 and partially disposed in the receiving region 58.

Figure 5:
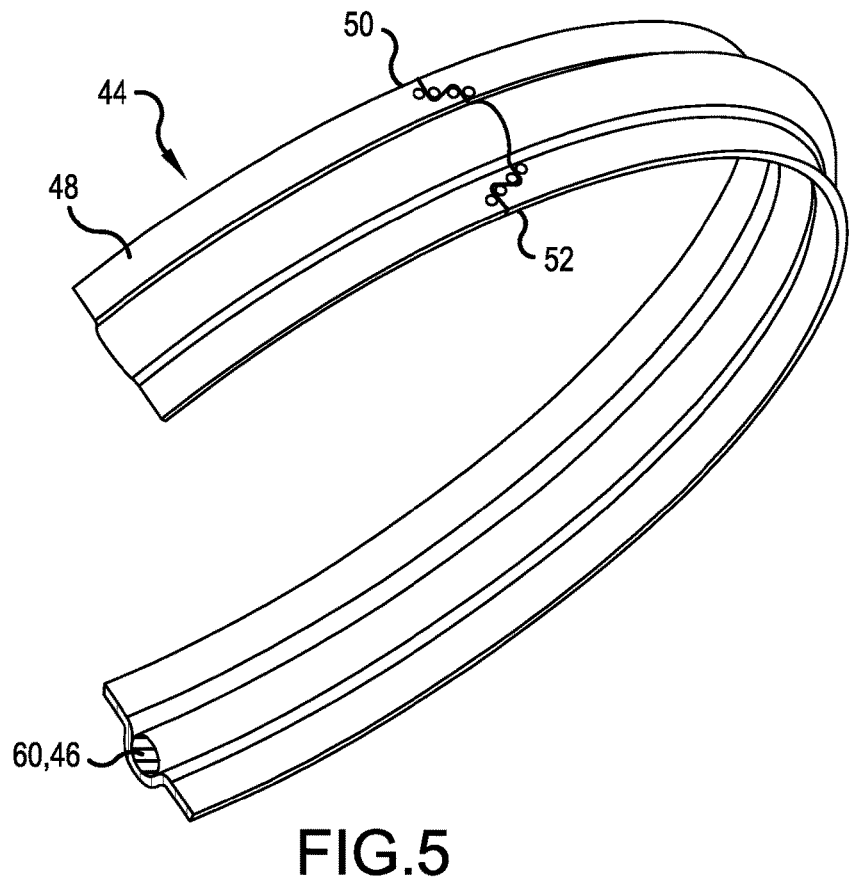
FIG. 5 is a perspective view of part of a seal unit of the wheel bearing unit of FIG. 4.
Figure 7:
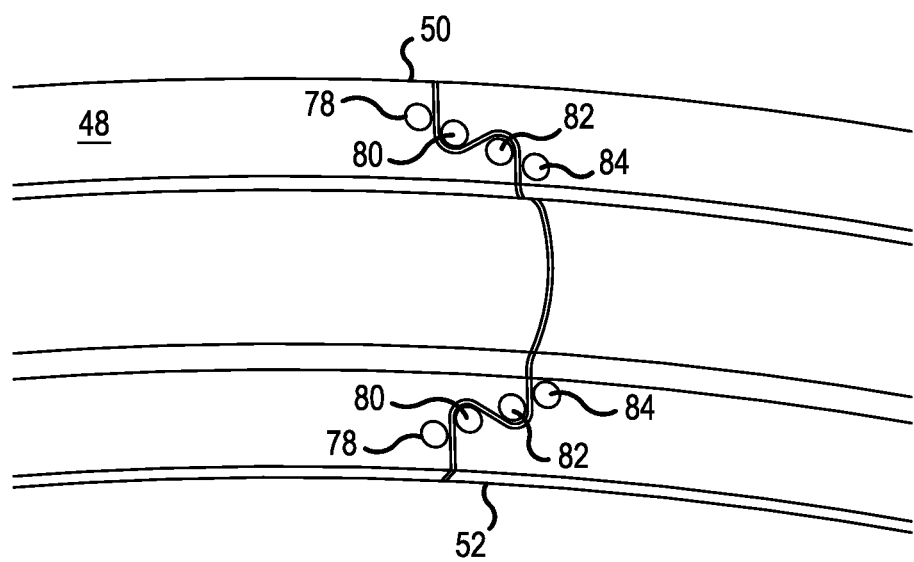
FIG. 7 is a perspective view of the seal unit of FIG. 5 illustrating an attachment point.

The manufacture of the component 48 begins with a sheet metal strip. This initially has essentially a shape of a rectangle. In a fully manufactured state of the component 48, ends 50, 52 of the sheet metal strip are attached to each other (FIGS. 5 and 7). During the manufacturing of the component 48, the ends 50, 52 are first processed. Here the end 50 is brought into a shape of a dovetail, and the end 52 is provided with an opening that also has a shape generally complementary to that of the dovetail. The bulge 76 is then generated by deforming the sheet metal strip. In a further step, the deformed sheet metal strip is bent into a ring, and the dovetail of the end 50 is introduced into the opening of the end 52 such that an interference-fit attaching of the two ends 50, 52 to each other is generated in the circumferential direction of the ring. Despite the interference-fit attaching of the two ends 50, 52 to each other, a small gap is still formed between the ends. For further improvement of the interference-fit attachment of the two ends to each other, impressions 78, 80, 82, 84 are also made inward in the radial direction at the ends 50, 52. Due to these impressions, a closing of the gap between the ends 50, 52 is at least largely, or completely, achieved. In addition, an attaching of the ends 50, 52 to each other is effected in the radial direction in a friction-fit manner. Overall, a very substantial reduction of the risk of the ends 50, 52 moving apart is achieved. Two impressions 82 are disposed on two tips of the dovetail of the end 50. Two impressions 78 are disposed on an axially outer region of the end 50 where the end 50 still has its entire axial width. Two impressions 80 are disposed on tips of the end 52 that lie axially inward. Two further impressions 84 are disposed on the end 52 opposite the impressions 82. After attaching the ends 50, 52 to each other, the seal element 46 is inserted into the receiving region 58. The method for manufacturing the seal unit is a part of the method for the manufacturing of the wheel bearing unit.

In principle, the ends 50, 52 can also be attached to each other in other ways, such as in particular by welding.

The essentially rotationally symmetric construction of the component 48 causes the component 48 to exert a pressure on the seal element 46 in the circumferential direction over the entire surface radially inward onto the inner rings, whereby a very particularly reliable seal is effected between the inner rings 31, 36.

The component 48 is thus also manufactured extremely efficiently, even in embodiments having different diameters. Due to the construction from sheet metal, no cost-intensive injection-molding tool is required as would be the case with a construction made of plastic. The sheet metal strip for manufacturing the component 48 can be cut to size in the correct length from a roll including metal tape that already has the desired thickness. Embodiments of the component 48 having different diameter can easily be formed by bending sheet metal strips having different length into the desired ring having the desired diameter. These different embodiments of the component 48 having different diameter can even be implemented in a single configuration of the machine used.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved seal unit for a wheel bearing.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

REFERENCE NUMBER LIST

10 Fitting surface
12 Fitting surface
14 Inner ring
16 Inner ring
18 Seal
20 Bearing raceway
22 Bearing raceway
24 Seal ring
26 Securing ring
28 Tooth
31 Inner ring
32 Rolling-element bearing
34 Wheel bearing unit
36 Inner ring
38 Rolling-element bearing
40 End side
42 End side
44 Seal unit
46 Seal element
48 Component
50 End
52 End
54 Outer side
56 Outer side
58 Receiving region
60 Seal ring
62 Raceway
64 Raceway
66 Outer ring
68 Rolling element
70 Rolling element
72 Region
74 Region
76 Bulge
78 Impression
80 Impression
82 Impression
84 Impression

What is claimed is:

1. A wheel bearing unit comprising:
a first inner ring having a first axial end side,
a second inner ring having a second axial end side contacting the first axial end side at a joint, and
a seal unit that seals the joint between the first inner ring and the second inner ring, the seal unit including at least one seal element and at least one further component that exerts pressure on the at least one seal element,
wherein the at least one further component is at least partially comprised of sheet metal,
wherein a radial outer surface of the first inner ring extending from the first axial end side is bounded by an imaginary cylinder and a radial outer surface of the second inner ring extending from the second axial end side is bounded by the imaginary cylinder,
wherein the at least one further component is located entirely outside the imaginary cylinder and comprises a sheet metal ring having a first cylindrical axial end portion, a second cylindrical axial end portion and a radially outwardly extending bulge defining a radially inwardly facing channel between the first and second cylindrical axial end portions, and
wherein the seal element comprises an O-ring mounted in the radially inwardly facing channel.

2. The wheel bearing unit according to claim 1,
wherein the at least one further component is completely comprised of sheet metal.

3. The wheel bearing unit according to claim 1,
wherein the at least one further component comprises a sheet metal ring.

4. The wheel bearing unit according to claim 3,
wherein the sheet metal ring includes a junction extending from a first axial edge of the sheet metal ring to a second axial edge of the sheet metal ring at which a first portion of the sheet metal ring is attached to a second portion of the sheet metal ring in an interference-fit and/or material-bonded manner.

5. The wheel bearing unit according to claim 4,
wherein the first portion of the sheet-metal ring has a dovetail shape.

6. The wheel bearing unit according to claim 1,
wherein the sheet metal ring includes a junction extending from a first axial edge of the sheet metal ring to a second axial edge of the sheet metal ring, a first portion of the sheet metal ring contacting a second portion of the sheet metal ring at the junction,
wherein the first portion comprises a dovetail,
wherein the second portion comprises an opening substantially complementary to the dovetail, and
wherein the first portion and the second portion each include at least one impression at a junction of the dovetail and the opening.

7. The wheel bearing unit according to claim 1,
wherein the imaginary cylinder intersects the seal element.

8. The wheel bearing unit according to claim 1,
wherein the O-ring is mounted in a depression at the joint, and
wherein the imaginary cylinder intersects the O-ring and does not pass through the depression.

9. A component for securing a seal ring to a bearing ring comprising:
a sheet metal ring having a first cylindrical axial end portion, a second cylindrical axial end portion and a radially outwardly extending bulge defining a radially inwardly facing channel between the first and second cylindrical axial end portions, and an O-ring mounted in the radially inwardly facing channel, wherein the sheet metal ring includes a junction extending from a first axial edge of the sheet metal ring to a second axial edge of the sheet metal ring, a first portion of the sheet metal ring being attached to a second portion of the sheet metal ring at the junction, wherein the sheet metal ring is bounded by an outer surface of an imaginary cylinder and wherein the first cylindrical axial end portion and the second cylindrical axial end portion lie on the imaginary cylinder, wherein the first cylindrical axial end portion extends from a first side of the channel to the first axial edge of the sheet metal ring and the second cylindrical axial end portion extends from a second side of the channel to the second axial edge of the sheet metal ring, and wherein the imaginary cylinder intersects the O-ring.

10. A method for manufacturing a wheel bearing unit, comprising:

placing an axial end side of a first bearing inner ring in contact with an axial end side of a second bearing inner ring such that the axial end side of the first bearing inner ring and the axial end side of the second bearing inner ring form a joint, and installing the component according to claim 9 around the joint such that the O-ring contacts an end of the joint and the sheet metal ring holds the seal ring against the joint.

\* \* \* \* \*